Oct. 13, 1964 L. MEYERSON 3,152,756
PAYROLL TAX COMPUTER DEVICE
Filed Oct. 18, 1962 5 Sheets-Sheet 1

INVENTOR.
LEONARD MEYERSON
BY
ATTORNEY

Oct. 13, 1964 L. MEYERSON 3,152,756
PAYROLL TAX COMPUTER DEVICE
Filed Oct. 18, 1962 5 Sheets-Sheet 2

INVENTOR.
LEONARD MEYERSON
BY
ATTORNEY

Oct. 13, 1964

L. MEYERSON 3,152,756

PAYROLL TAX COMPUTER DEVICE

Filed Oct. 18, 1962

INVENTOR.
LEONARD MEYERSON
BY

ATTORNEY

Oct. 13, 1964  L. MEYERSON  3,152,756
PAYROLL TAX COMPUTER DEVICE
Filed Oct. 18, 1962  5 Sheets-Sheet 4

INVENTOR.
LEONARD MEYERSON
BY
ATTORNEY

Oct. 13, 1964     L. MEYERSON     3,152,756
PAYROLL TAX COMPUTER DEVICE

Filed Oct. 18, 1962     5 Sheets—Sheet 5

INVENTOR.
LEONARD MEYERSON
BY
ATTORNEY

United States Patent Office 3,152,756
Patented Oct. 13, 1964

3,152,756
PAYROLL TAX COMPUTER DEVICE
Leonard Meyerson, 5555 Netherland Ave.,
New York 71, N.Y.
Filed Oct. 18, 1962, Ser. No. 231,399
2 Claims. (Cl. 235—88)

This invention relates generally to calculators and more particularly to a calculator or arithmetic tracking system for computing weekly social security deductions, disability benefits and the like.

Under the provisions of the current Federal and State tax laws pertaining to the collection of income tax at the source on wages, all employers are required to deduct and withhold certain taxes from the wages of their employees. These taxes are based on a certain amount over a withholding exemption determined by the family status of the employee.

The weekly computation of said taxes for large payrolls and for payrolls where the wages are in odd amounts, resulting, for example, from the payments of wages on a piece or hourly basis, has proven to be a difficult task. Therefore, a principal object of the present invention is to provide a calculator or arithmetic tracking system whereby determination of such taxes is automatic and is facilitated.

Another object of the invention is to provide a calculator or arithmetic tracking system in which only the number of dollars of a wage need be set and on which the tax can be read opposite the number or cents of a wage.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
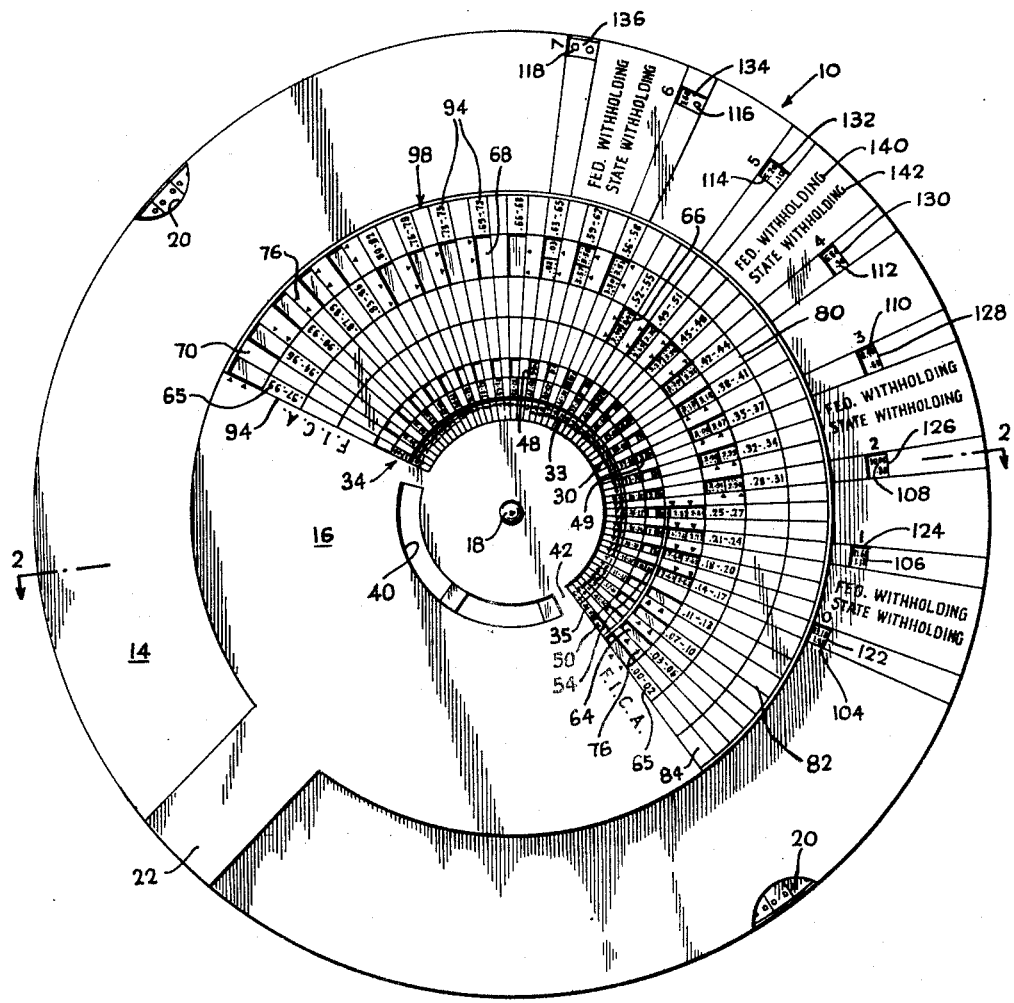
FIG. 1 is a top plan view of a calculator embodying the present invention.
Figure 2:
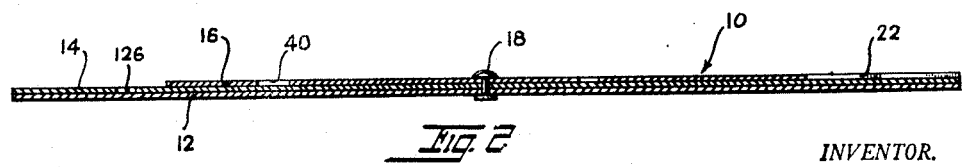
FIG. 2 is a cross-sectional view taken on the line 2—2 of FIG. 1.
Figure 3:
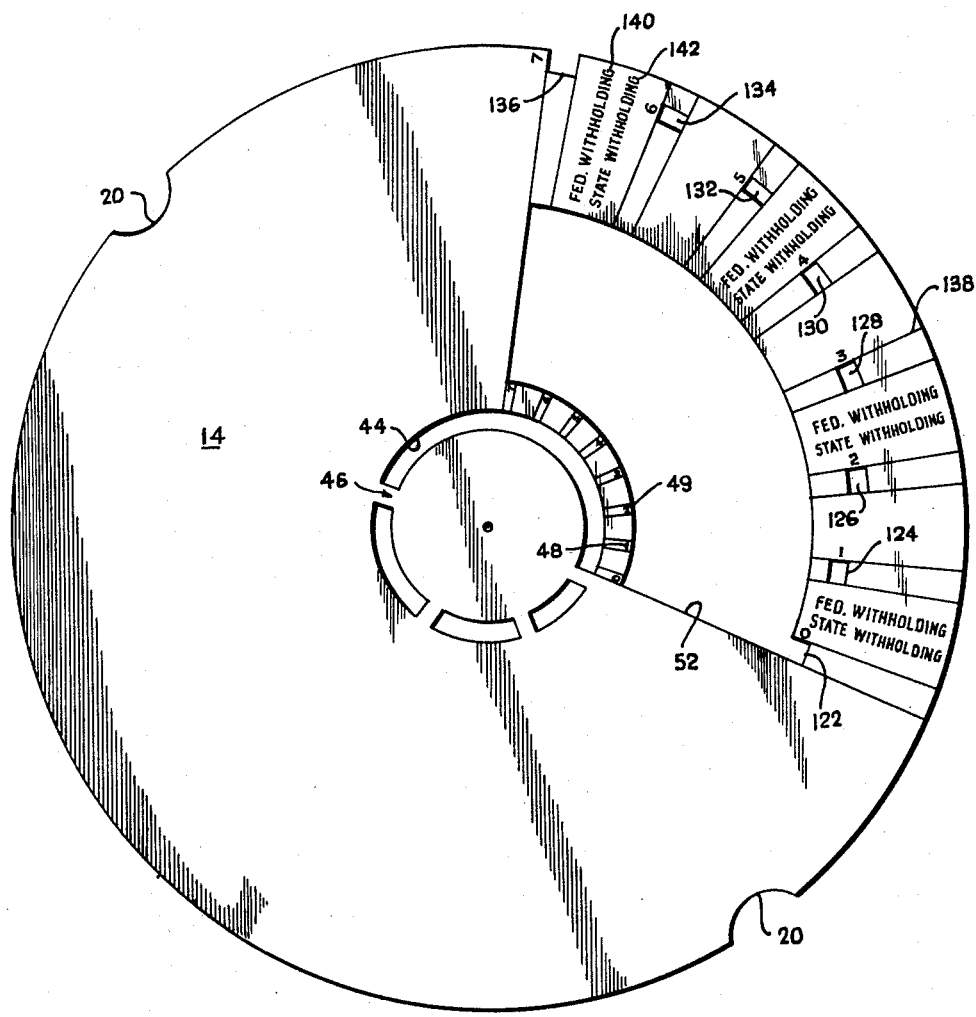
FIG. 3 is a top plan view of the intermediate disc.

Referring in detail to the drawings, in FIG. 1 a calculator embodying the invention is illustrated and designated generally by the reference numeral 10. The calculator comprises a stationary bottom disc-shaped base 12, an intermediate disc 14 and a top disc 16. The discs are circular in outline and are concentrically arranged and centrally apertured to admit a common pivot pin 18 relative to which all of the discs are rotatable and which also serves to hold the discs in assembled relationship.

The discs are preferably made of semirigid material such as cardboard, sheet metal or plastic capable of holding its shape and able to carry suitable indicia, which can be provided in any manner well known to the art, as for example by printing, impressing, or molding.

The disc-shaped base 12 and the intermediate disc 14 are of similar dimensions but the top disc 16 is smaller in diameter than the others, so that when the discs are coaxially arranged the rim of the intermediate disc 14 is visible.

In order to facilitate the manipulation of the calculator, it is desirable to have the intermediate disc 14 and the top disc 16 rotate together when the intermediate disc is turned, but top disc 16 must be permitted to rotate relative to the intermediate disc 14. To this end, the top disc 16 rests in engagement with the top surface of the intermediate disc and rotates with the intermediate disc by friction when the intermediate disc is manually turned. For this purpose, the intermediate disc 14 is formed with opposed notches or recesses 20 in the periphery thereof. A finger piece 22 is formed on the periphery of the top disc 16 and radiates therefrom for the purpose of turning the top disc relative to the intermediate disc. The friction created by engagement of the top disc on the intermediate disc is so slight that it can easily be overcome when it is desired to independently rotate the top disc. However, it is sufficient to cause the intermediate disc and the top disc to rotate when the intermediate disc is turned without holding the other. This frictional contact is enhanced by the large area of the finger piece 22.

The disc-shaped base 12 on its surface is lined with concentric lines 26 and radial lines 28, intersecting the concentric lines thereby forming concentrically and radially arranged boxes 29. The radial lines define columns 27. The concentric boxes 29 provide space for at least eight concentric scales extending around 360°. The innermost concentric circle of boxes 29 constitute a scale 30, comprising all the whole numbers from 0 through 99 indicated at 33 serially arranged with a graduation for each number. More whole numbers may, of course, be included, if desired, but limiting the numbers from 0 to 99 enables scale 31 to embrace but few numbers thus insuring ease of computation and the use of large and legible numbers. The boxes as well as the numbers are arranged at equal intervals and read in dollars of a wage earner.

The top disc 16 on its surface is provided with a scale 34 adjacent its center and outwardly of and adjacent to the innermost scale 30 on disc base 12. Scale 34 extends substantially 180° around and constitutes pairs of hyphenated numbers indicated at 35 arranged at the same angular intervals as the number in the innermost scale 30 on base 12 and read in cents of a wage earned. The numbers on the scale 34 are grouped in the boxes 29 opposite alternate numbers on the innermost scale 30 on base 12. The boxes 29 group the numbers such as 00–01 in such fashion that the grouping defined by the boxes represent that the tax for a given tax rate will be the same for all the numbers of pennies in each box, mills less than five being disregarded and from five up treated as an additional penny.

The top disc 16 is formed with a circular shaped slot forming a window 40 extending around substantially the length of the scale 34 and exposing the innermost scale 30 on base 12. The circular slot 40 is only interrupted by a pair of opposed narrow strips 42 extending across the window.

The intermediate disc 14 is also formed with a circular slot forming a window 44 under and aligned with the circular window 40 in top disc 16, however in this slot four narrow strips 46 extending across the window interrupt the circularity of the window. On the top surface of the intermediate disc 14 there is a scale 48 arcuate in formation extending approximately 90° around. Scale 48 is constituted by spaced whole numbers from 0 to 7, indicated at 49, and read in number of dependents of the wage earner or tax payer. Scale 48 may be printed in a color contrasting to the colors of the other scale, such as red. Scale 48 is next outermost from scale 34 on top disc 16 and at the same angular disposition but at alternate intervals. The numbers on scale 48 are exposed through elongated slots or windows 50 formed in top disc 16 above the numbers and disposed in arcuate formation, extending approximately 180° around. The scale 48 extends for approximately 90° around said window formation.

The intermediate disc 14 is formed with a segmental shaped opening or window 52 extending from the outermost edge of scale 48 to the outermost concentric line 28 on base 12.

The next outermost scale in plan is on the base 12 and is indicated at 54 extending 360° around. Scale 54 constitutes all of the whole numbers from 0 to 30 with pairs of numbers from 01 to 29, inclusive, in succession, and a group of forty-one 30 numbers in succession. The numbers on this scale 54 are arranged at equal intervals at the center and read in dollars for New York State disability benefits, for example. The scale 54 is exposed through the windows 50 in top disc 16 and aligned window 52 in intermediate disc 14.

The next circular outermost scales in plan are eight in number on base 12, outermost of scale 54, and are indicated at 56, 57, 58, 59, 60, 61, 62, 63. The scales extend 360° around and the numbers are arranged at the same angular intervals as the numbers on scale 30 on base 12. The scales constitute numbers indicated at 65 representing cents and dollars from 00 cents to $3.62 in brackets of two numbers. The numbers are arranged in four pairs of boxes or brackets extending radially outwardly, for example, all the way from (00–01), (01–02), (02–03), (03–04) to (3.59–3.60), (3.60–3.61), (3.61–3.62), (3.62–3.63).

The boxes or bracketed numbers on scales 56 and 57 are exposed through a number of juxtaposed slots forming windows 64 in arcuate formation extending approximately 90° around in top disc 16 and through aligned window 52 in intermediate disc 14; the boxed numbers on scales 58 and 59 are exposed through a number of juxtaposed slots forming windows 66 in arcuate formation extending from the end of windows 64 and around 90° and offset outwardly, and through segmental-shaped aligned window 52 in intermediate disc 14; the boxed numbers on scales 60 and 61 are exposed through a number of juxtaposed slots forming windows 68 in arcuate formation extending from the end of windows 66 around 90° and offset outwardly from windows 64 and through segmental-shaped window 52 in intermediate disc 14; and the boxed or bracketed numbers on scales 62 and 63 are exposed through a number of juxtaposed slots forming windows 70 in arcuate formation extending from the end of windows 66 around 90° and offset outwardly from windows 66 and through segmental-shaped window 52 in intermediate disc 14.

The numbers 65 on scales 56, 57, 58, 59, 60, 61, 62, 63 are read as Federal old age taxes or Social Security deductions.

Scales 56, 57, 58, 59, 60, 61, 62, 63 are read in conjunction with symbols such as a plurality of spaced colored selector dots 74 in each box 29 above and below the numbers 65 therein and triangular-shaped pointed selector indicators 76 of various colors on the solid portions of the top disc 16 between the windows 64, 66, 68, 70 in top disc 16.

The top disc 16 is also lined with arcuate concentric lines 80 forming extensions of the ends of the elongated rectangular-shaped windows 64, 66, 68, 70 formed therein, and with intersecting radial lines 82 intersecting the concentric lines 80 and extending along the long sides of the windows. The intersecting concentric and radial lines form boxes or brackets 84 on the top surface of the top disc.

A scale 86 is printed on the top surface of the top disc 16 in the boxes or brackets 84 in line with the windows 66. The scale extends approximately 90° around and comprises numbers 88 representing pairs of cents such as .00–.02, .03–.06, .07–.10, .11–.13, .14–.17, .18–.20, .21–.24, .25–.27. These numbers read in cents of Federal old age taxes or Social Security deductions computed and are used in conjunction with the numbers in scales 56, 57.

A scale 90 is printed on the top surface of the top disc 16 in boxes or brackets 84 in line with the windows 68 on one side thereof. The scale extends approximately 90° around and comprises numbers 92 representing pairs of cents such as .28–.31, .32–.34, .35–.37, .38–.41, .42–.44, .45–.48, .49–.51, .52–.55. These numbers read in cents of Federal old age taxes or Social Security deductions computed and are used in conjunction with the numbers in scales 60, 61.

Another scale 94 is printed on the other side of the windows 68 on disc 16 in line therewith. This scale 94 extends approximtaely 90° around and comprises numbers 96 representing pairs of cents such as .83–.86, .87–.89, .90–.93, .94–.96, .97–.99. These numbers read in cents of Federal old age taxes or Social Security deductions computed and are used in conjunction with the numbers on scales 62, 63.

A scale 98 is printed on the top disc 16 in the boxes 84 in arcuate formation in line with the windows 70. Scale 98 extends approximately 90° around and comprises numbers 100 representing pairs of cents such as .56–.58, .59–.62, .63–.65, .66–.68, .69–.72, .73–.75, .76–.79, .80–.82. The numbers 100 read in cents of Federal old age taxes or Social Security deductions computed and are used in conjunction with the numbers on scales 60, 61.

Outwardly of the outermost concentric lines 26, on base 12, eight additional concentric scales are printed on the top surface thereof between the radial lines 28. These scales are indicated at 104, 106, 108, 110, 112, 114, 116, 118 and are constituted by numbers indicated at 120 representing dollars and cents and zeros and read as Federal withholding taxes and State withholding taxes. The numbers are arranged in the same angular relationship as the numbers on the scale 30, and one radial line of numerals is preferably printed in black to represent the Federal withholding taxes and another radial line of numbers is preferably printed in red to represent the State withholding taxes.

The numbers on the scale 104 are exposed through a cutaway portion on the edge of window 52 of intermediate disc 14 forming a window 122. The window 122 is identified by a numeral such as "0" printed alongside, representing the number of exemptions.

The numbers on the scale 106 are exposed through an opening cut in intermediate disc 14 offset outwardly from window 122 and forming a window 124. Window 124 is identified by numeral "1," representing the number of exemptions.

The numerals on the scale 108 are exposed through an opening cut in the intermediate disc offset outwardly from window 124 and forming a window 126. Window 126 is identified by numeral "2," representing the number of exemptions.

The numbers on the scale 110 are exposed through an opening cut in the intermediate disc offset outwardly from window 126 and forming a window 128. Window 128 is identified by numeral "3," representing the number of exemptions.

The numbers on scale 112 are exposed through an opening cut in the intermediate disc offset outwardly from window 128 and forming a window 130. Window 130 is identified by numeral "4," representing the number of exemptions.

The numbers on scale 114 are exposed through an opening cut in the intermediate disc offset outwardly from window 130 and forming a window 132. Window 132 is identified by numeral "5," representing the number of exemptions.

The numbers on scale 116 are exposed through an opening cut in the intermediate disc offset outwardly from window 132 and forming a window 134. Window 134 is identified by numeral "6," representing the number of exemptions.

The numbers on scale 118 are exposed through an opening cut in the intermediate disc offset outwardly from window 134 and forming a window 136. Window 136 is identified by numeral "7," representing the number of exemptions.

Radial lines 138 on the intermediate disc 14 along the the sides of the window assist in registering the windows with the proper numbers.

Indicia 140 and 142 may be printed on the top surface of the intermediate disc 14 adjacent the window displaying the withholding taxes to identify the type of taxes, such as the words "Fed. Withholding" and "State Withholding," respectively. It is preferred that the indicia correspond with the coloring of the numbers for the respective taxes, such as black for "Fed. Withholding" and red for "State Withholding." For example, the numbers in the scales 104–118 reading radially between one pair of radial lines 29 reads as follows: 13.10, 10.80, 8.50, 6.20, 3.90, 1.60, 0, 0 in black along the Federal withholding tax line, and 1.40, .90, .60, .20, 0, 0, 0, 0 in red, along the State withholding tax line.

It will be noted that windows 50, 64, 66, 76 are disposed at different radial distances from the pivot 18 so as to enable the scales 56, 57, 58, 59, 60, 61, 62, 63 to be radially spaced from each other. Disc 12 carries eight circular scales 56 to 63, inclusive, which read in the Federal old age tax or Social Security deductions to the penny. Disc 12 also carries eight circular scales 104 to 118, inclusive, which read in the Federal withholding tax and the State withholding tax to the penny. The numbers on scales 104 to 118, inclusive, are adapted to be read through the windows 122 to 136, inclusive. Successive windows are disposed at different radial distances from the pivot 18 to radially space the scales 104 to 118, inclusive, where they overlap. Scale 48 is used for setting exemptions into the calculator and the spacing between successive numbers 49 is therefore a function of a common factor (preferably the largest common factor) of the various possible exemptions.

Broadly, the improved calculator or arithmetic tracking system is a device for selecting the correct products (social security deductions) of a given multiplier of a series of multiplicands. Each device is plotted for a single multiplier. The description below is for a device whose multiplier is .03625 and the multiplicands range from 0 to 9999. The number of columns, pairs of boxes for each column and design patterns of the selector dots 74 will vary with each multiplier.

The calculator or arithmetic tracking system includes the base disc 12, intermediate disc 14 and top disc 16. Base disc 12 is divided into a plurality of columns 27, one hundred columns being shown.

The numbers 120 on the base 12 are adapted by the windows 64, 66, 68, 70 in top disc 16, to be divided concentrically into four groups of boxes 29. In each box 29 there is placed a product (social security deduction) of .03625 for the designated multiplicand in a pattern that is exclusive to that particular multiplier. The arrangement of numbers 120 on the disc 12 indicates the pattern for the multiplier .03625. The pattern shown thereon reveals that for the multiplicands from 0 to 799 the products will vary from 0 to 29. Since at .03625 the pattern will repeat itself at every 8th digit, the multiplicands from 800 to 1599 will result in products varying from 30 to 58 which will be plotted into the concentric sets of boxes in exactly the same pattern as 0 to 29. Likewise from 1600 to 2299, 2300 to 2999 and so forth.

Figure 4:
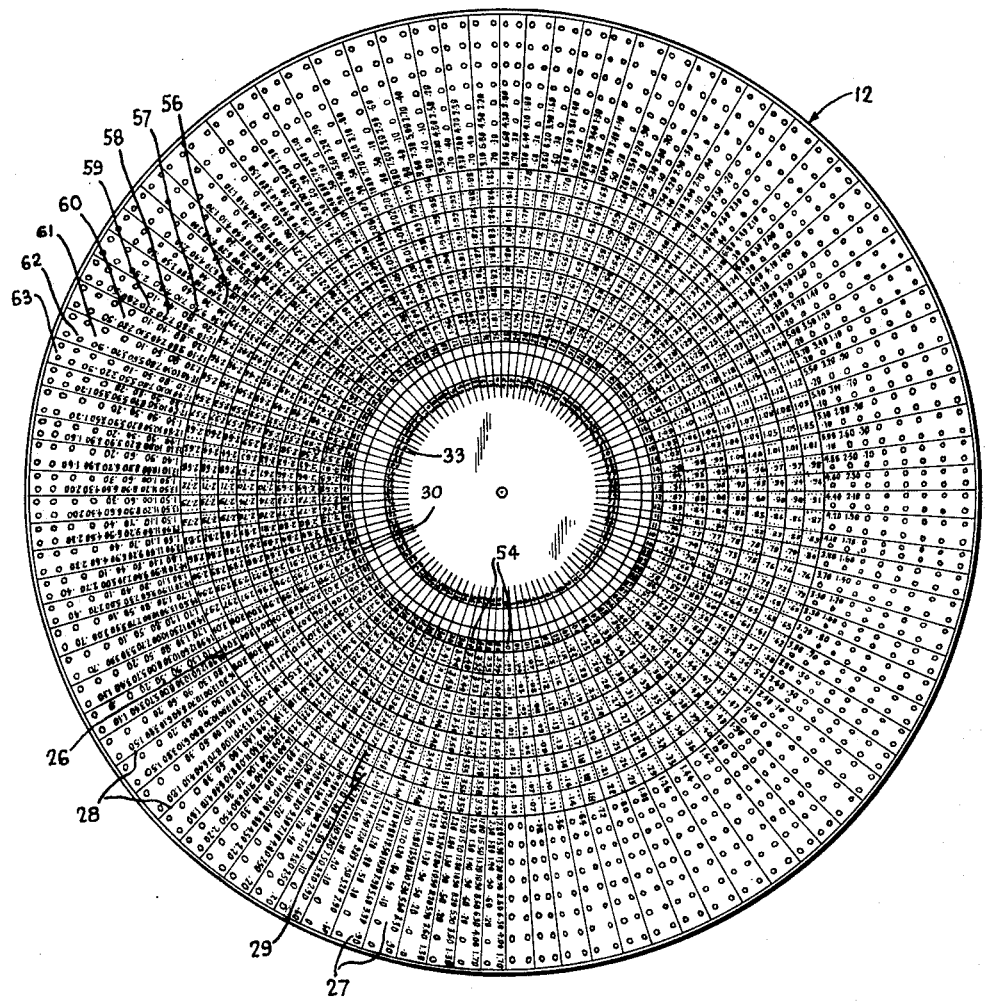
FIG. 4 is a top plan view of the base.

Eight selector dots 74 are divided between each pair of boxes 29 in a basic design pattern characteristic of only that particular multiplier, in this case .03625. In order to conserve space four dots 74 are placed on the right side of the boxes 29 as viewed in FIG. 4 and four dots on the left side. Of course, the dots may be placed on either the right or the left hand of the box. The design pattern of the selector dots 74 serve as a memory system for the ultimate selection of the proper product (social security deduction). The top disc 16 is provided with windows to reveal the boxes 29, one window being long enough to reveal one pair of boxed numbers 120, and wide enough to reveal one column 27.

Eight windows 64 will open onto pairs of numbers 120 on the base 12 through window 52 on disc 14, reading as follows; for example: 5.80, 5.81; 5.87, 5.88; 5.95, 5.96; 6.02, 6.03; 6.09, 6.10; 6.16, 6.17; 6.24, 6.25; 6.31, 6.32.

Eight other windows 66 will open onto pairs of numbers 120 on the base 12, reading as follows, for example: 6.39, 6.40; 6.46, 6.47; 6.51, 6.55; 6.61, 6.62; 6.68, 6.69; 6.75, 6.76; 6.83, 6.84; 6.90, 6.91.

Eight other windows 68 will open onto pairs of numbers 120 on the base 12, reading as follows, for example: 6.98, 6.99; 7.05, 7.06; 7.13, 7.14; 7.20, 7.21; 3.65, 3.66; 3.72, 3.73; 3.79, 380; 3.86, 3.87.

Five other windows 70 will open onto pairs of numbers 120 on the base 12, reading as follows, for example: 3.95, 3.95; 4.02, 4.02; 4.09, 4.10; 4.16, 4.17; 4.24, 4.24.

The selector indicators 76 are placed on top disc 16 in the following manner alongside of each window of each series of window 64, 66, 68, 70.

Figure 5:
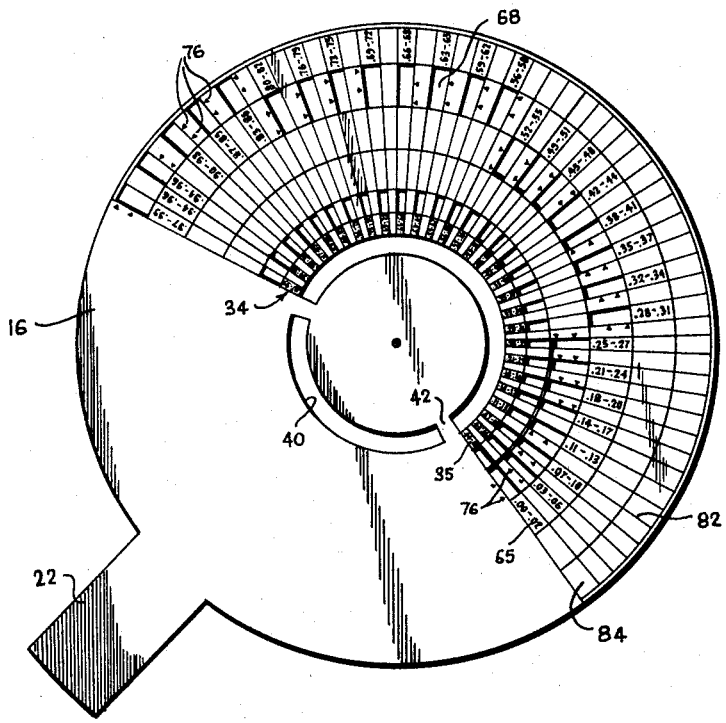
FIG. 5 is a top plan view of the top disc.
Figure 6:
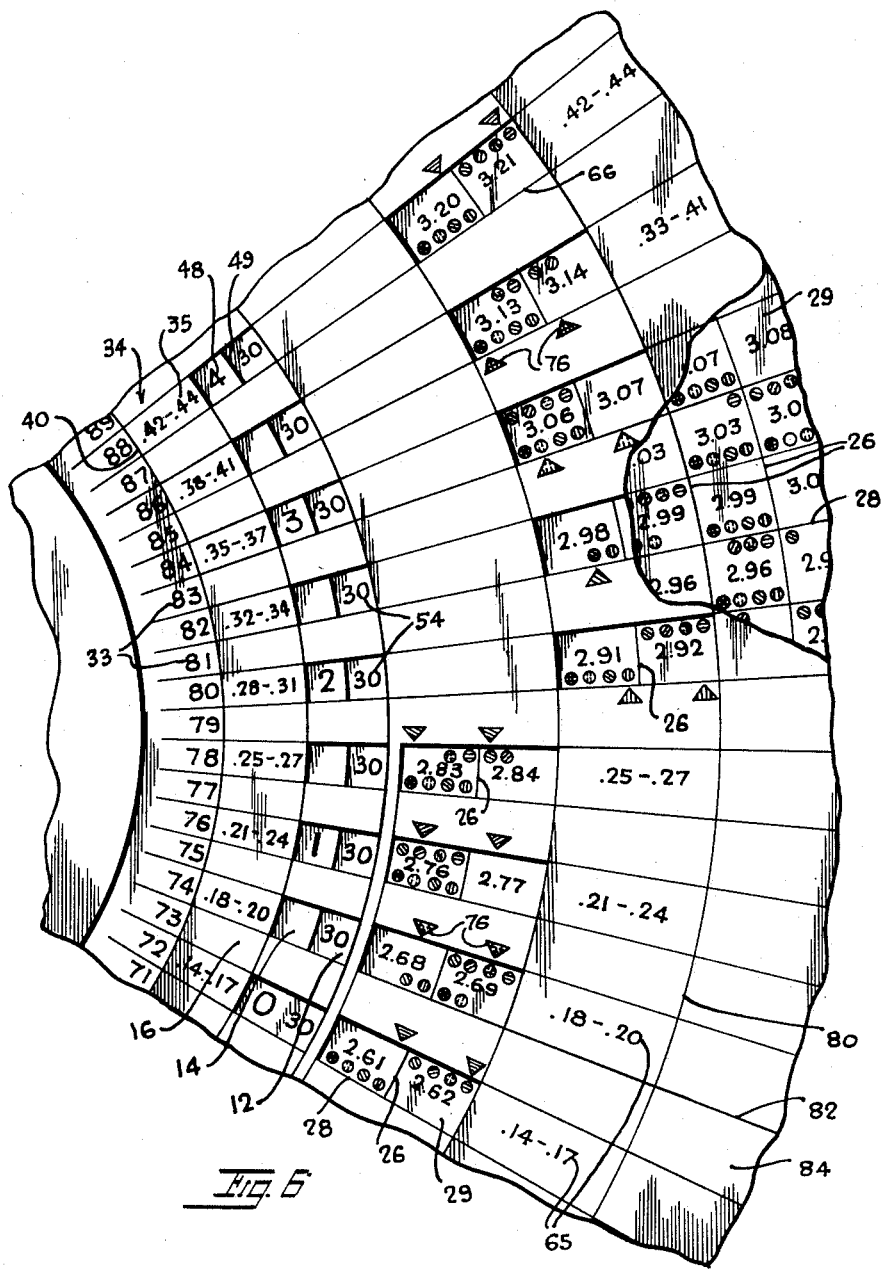
FIG. 6 is a top plan view of a fragment of the base on an enlarged scale.

Alongside the first window, reading from left to right as viewed in FIGS. 1 and 5, one pointed selector 76 is placed on the lower left quarter of each box 29 in the window.

Alongside the second window, one pointed selector in the second lower left quarter of each box 29 in the window.

Alongside the third window, one pointed selector in the third lower left quarter of each box 29 in the window.

Alongside the fourth window, one pointed selector in the upper left quarter of each box 29 in the window.

Alongside the fifth window, one pointed selector in the lower right quarter of each box 29 in the window.

Alongside the sixth window, one pointed selector in the second lower right quarter of each box 29 in the window.

Alongside the seventh window, one pointed selector in the third lower right quarter of each box 29 in the window.

Alongside the eighth window, one pointed selector in the upper right quarter of each box 29 in the window.

Inasmuch as there are only five windows marked 70, only five pairs of pointed selectors 76 are shown, and the description of the first five windows above control.

When the disc 16 is rotated over discs 14 and 12, the digits on disc 16 in conjunction with the columnar designations of disc 12 over which the windows appear will indicate the multiplicand. One selector indicator 76 of each pair of selector indicators on disc 16 will directly face a corresponding selector dot on disc 12 indicating the correct product, to wit, social security deduction. The second indicator of the pair will point to a blank space on the disc 12.

In illustration of the computation capable of being produced by the calculator 10, in FIG. 1 it will be seen if the tax payer earns $76.00 plus between 21¢ and 24¢ the social security deduction is shown on scale as reading $2.76 as the indicator 76 is pointing to the upper third right quarter of the box 29 and the indicator is pointing to the dot 74 in the third quarter upper right of the box. From the window 122 in disc 14, it will be seen that the Federal withholding tax computed is $11.60 and the State withholding tax is $1.10. This computation is done automatically by manually turning the dials 14 and 16.

It will be apparent from the foregoing description of the calculator and its operation that the same is capable of many alterations without departing from the spirit of the invention. Thus, although the several discs have been described as being substantially circular in outline and their relative motion as rotary, straight slides having linear motion and relatively nested one within another could be used. Likewise, only two discs instead of three might be used. Also, a rectangular chart in conjunction with a rectangular slotted chart might be used.

It will further be understood that the calculator might be arranged to handle the computation of taxes at tax rates and exemptions other than the rates given above, it only being necessary for this purpose to employ figures on the several scales consistent with the changed tax rates and variable exemptions and alter the spacing of the figures to account for variations in fixed exemptions.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A tax calculator comprising a relatively fixed disc-shaped base, an intermediate disc on said base, a top disc on said intermediate disc, a pivot pin extending through said base and discs interconnecting said base and discs for relative rotary movement, a scale of wages earned on the top surface of the base, in units of dollars, a scale of wages on the top surface of the top disc in units of cents to be set against the dollar units on the first scale, eight scales of taxes on the top surface of the base at different tax rates, in units of dollars and cents, four scales of taxes on the top surface of the top disc at different rates in units of cents to be set against the dollars and cents units on said eight scales on the base, a scale of tax exemptions on the intermediate disc, said top disc carrying means for cooperation with said scale of exemptions to relatively set said intermediate and top discs, a finger piece with a large area on the top disc over said intermediate disc and base to set said top disc relative to the scale of wages earned, and means on the top disc to read a tax on each of the eight scales, a scale of disability benefits on the top surface of the base, means on the top disc to read the disability benefits on said scale, a scale of Federal withholding taxes on the top surface of the base, a scale of State withholding taxes on the top surface of the base, and means on the intermediate disc to read a tax on said withholding tax scales.

2. A tax calculator comprising a relatively fixed disc-shaped base, an intermediate disc on said base, a top disc on said intermediate disc, a pivot pin extending through said base and discs interconnecting said base and discs for relative rotary movement, a scale of wages earned on the top surface of the base, in units of dollars, a scale of wages on the top surface of the top disc in units of cents to be set against the dollar units on the first scale, eight scales of Federal old age taxes on the top surface of the base at different tax rates, a scale of tax exemptions on the intermediate disc, said top disc having windows for cooperation with said scale of exemptions to relatively set said intermediate and top discs, said top disc having windows over said intermediate disc to set said top disc relative to the scale of wages, and windows in the top disc to read a tax on each of the eight scales, a scale of disability benefits on the top surface of the base, said top disc having windows to read the disability benefits on said scale, a scale of Federal withholding taxes on the top surface of the base, a scale of State withholding taxes on the top surface of the base, said intermediate disc having offset windows and opposed peripheral notches to permit reading a tax on said withholding tax scales printed on said top surface of said base.

References Cited in the file of this patent

UNITED STATES PATENTS

| | | |
|---|---|---|
| 1,962,866 | Graham | June 12, 1934 |
| 2,424,890 | Howells | July 29, 1947 |
| 2,427,976 | Posson | Sept. 23, 1947 |
| 2,682,372 | Romani | June 29, 1954 |
| 2,769,593 | Safranek | Nov. 6, 1956 |